No. 858,796. PATENTED JULY 2, 1907.
E. DUMAS.
AUTOMOBILE AND OTHER MOTOR VEHICLE.
APPLICATION FILED MAR. 11, 1905.

WITNESSES,
George G. Schoenlank

INVENTOR,
Eugenio Dumas,
BY
HIS ATTORNEY.

UNITED STATES PATENT OFFICE.

EUGENIO DUMAS, OF BUENOS AYRES, ARGENTINA.

AUTOMOBILE AND OTHER MOTOR-VEHICLE.

No. 858,796.  Specification of Letters Patent.  Patented July 2, 1907.

Application filed March 11, 1905. Serial No. 249,574.

*To all whom it may concern:*

Be it known that I, EUGENIO DUMAS, a citizen of Argentine Republic, residing at Buenos Ayres, Calle Victoria 372, in the Argentine Republic, have invented new and useful Improvements in Automobiles and other Motor-Vehicles, of which the following is a specification.

This invention relates to improvements in construction of automobiles and other motor vehicles.

The new type of motor vehicle devised by me is especially useful in traveling over rough roads, such as the highways of suburban and country districts. It is a characteristic of such roads that they usually have three tracks, a center track made by horses drawing vehicles, and tracks, at either side of the center one, and resulting from the wheels of the vehicles drawn over the road. It has been a source of annoyance and considerable difficulty to adapt motor-vehicles having ordinary running-gear and running-frames, to the inequalities of such tracks. The form of automobile hereinafter described, and illustrated in the accompanying drawings, is adapted to run in a single track (which will preferably be the central one, made by the draft-animals), and will, therefore, be free of the objections noted.

One embodiment of my invention is shown in the accompanying drawings, in which

Figure 1:
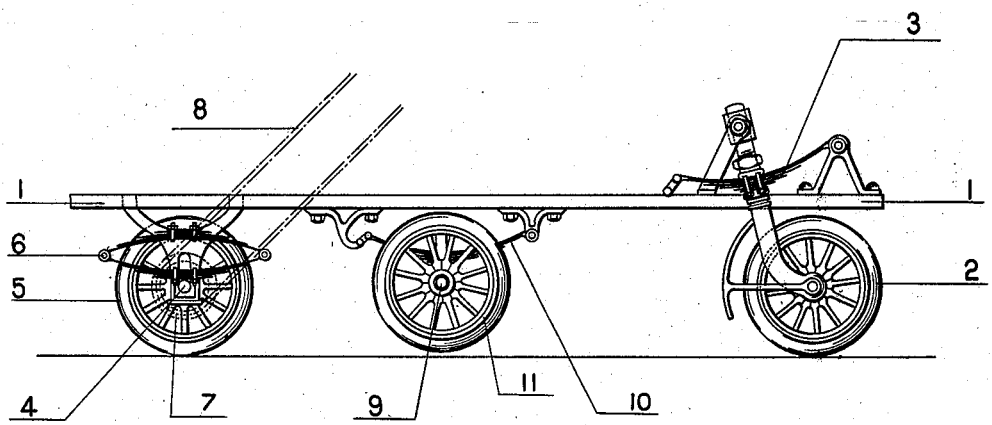
Figure 2:
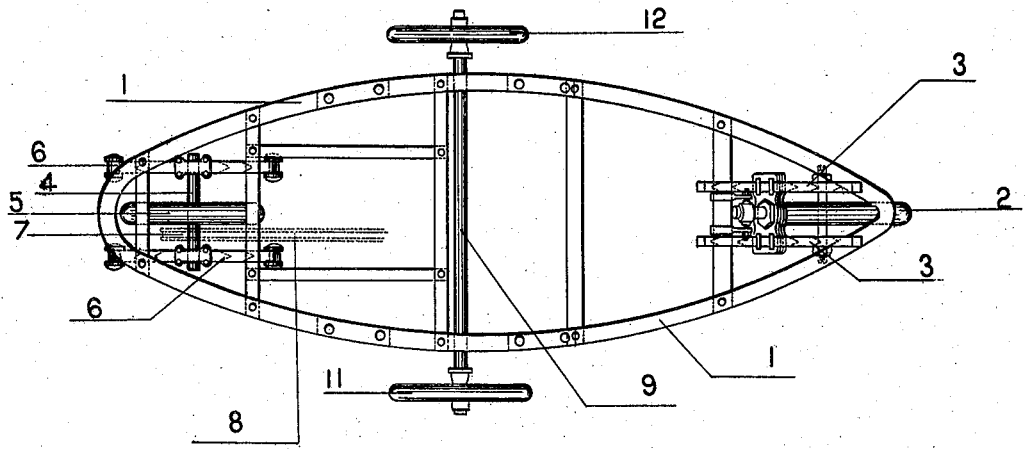

Figure 1 is a side view of an automobile, and Fig. 2 is a top view thereof.

The vehicle is provided with a frame, 1, which may be a form of running-frame. The particular form illustrated is not that necessarily employed by me, but is a preferred form only.

At its forward end, the vehicle is provided with a centrally-disposed steering-wheel, 2, which is preferably connected with the vehicle-body or frame by yielding connections, such as a pair of leaf springs, 3. Such combination results, substantially, in spring-suspending the vehicle-body or frame upon or flexibly connecting it with the steering-wheel frame. The steering-post of the wheel 2, is adapted to be rocked (by any suitable connections, not shown) about a vertical pivot.

The motor-vehicle is provided with a single rear running-wheel, 5, mounted to revolve in line with the steering-pivot of the forward wheel. Said rear running-wheel is secured upon an axle, 4, which revolves in oppositely disposed journal-boxes adapted to have up and down movements in slotted pedestal-frames (see Fig. 1), and which journal-boxes are yieldingly connected by leaf-springs, 6, 6, with the upper portions of the pedestal-frames or otherwise directly or indirectly, and preferably flexibly, connected with the vehicle-body or frame. The rear axle, 4, also carries a sprocket or pulley, 7, driven, by a chain or band, from a motor (not shown) carried by the vehicle.

At a point between the wheels 2 and 5 (preferably midway), the vehicle is provided with a transverse axle, 9, preferably yieldingly connected, by single leaf-springs, 10, and link-joints, with the body or main frame. The axle 9 carries, at either end, the wheels 11 and 12, which are arranged to normally act as steadying-wheels, maintaining the equilibrium of the vehicle, and when the vehicle is running to be, either or both, out of touch with the road, except when the vehicle is swaying. The wheels 11 and 12 will preferably be spaced apart about the same distance as the wheels of ordinary vehicles, so as to run in or engage with, when necessary, the wheel-tracks of the roadway.

The springs 3, 6, and 10, will take up the shocks due to running, and prevent strains upon the frame and wheels.

The construction of vehicle devised by me, owing to the arrangement of the wheels as shown, not only permits easy and speedy travel over bad roads, but has numerous other advantages, such as dispensing with, the heavy, expensive and delicate variable-speed intermediate connections heretofore employed.

What I claim is:

In a motor vehicle, a horizontally-disposed body-frame, with running-gear having a single centrally-disposed driving wheel 5 which is spring-supported at opposite sides by leaf springs 6, and having three guiding-wheels comprising a forward centrally-disposed steering-wheel 2 which is spring-supported above the body of the frame and at opposite sides by leaf springs 3, and two oppositely-disposed running-wheels 11 and 12 supported by springs and disposed between the steering-wheel and the driving-wheel.

In testimony whereof I have signed my name to this specification in the presence of two subscribing witnesses.

EUGENIO DUMAS.

Witnesses:
B. R. OBLIGADO,
F. E. MILLER.